W. DENTON.
MOTOR VEHICLE.
APPLICATION FILED MAR. 3, 1910.
987,119.
Patented Mar. 21, 1911.
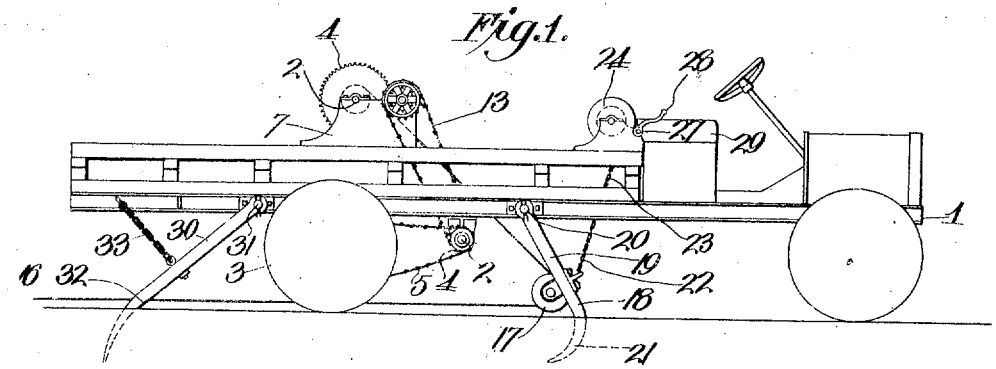
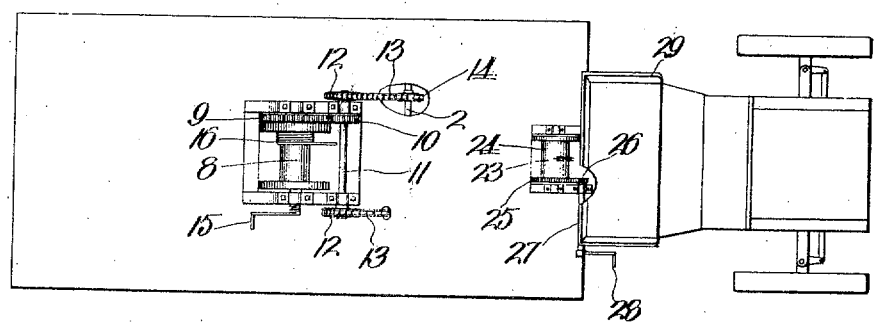
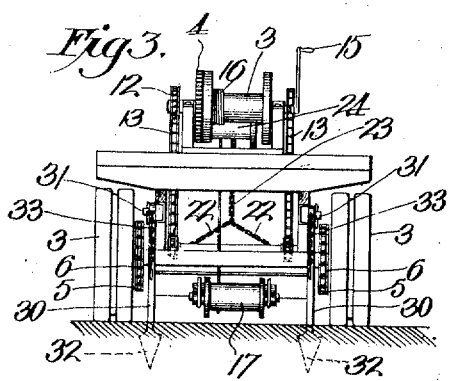
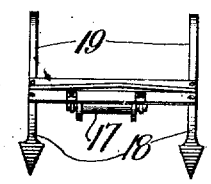
Witnesses
Frank R. Glor
H. C. Rodgers
Inventor
Winfield Denton
By George H. Thorpe Atty.

UNITED STATES PATENT OFFICE.

WINFIELD DENTON, OF LEAVENWORTH, KANSAS.

MOTOR-VEHICLE.

987,119.  Specification of Letters Patent.  Patented Mar. 21, 1911.

Application filed March 3, 1910. Serial No. 547,363.

*To all whom it may concern:*

Be it known that I, WINFIELD DENTON, a citizen of the United States, residing at Leavenworth, in the county of Leavenworth and State of Kansas, have invented certain new and useful Improvements in Motor-Vehicles, of which the following is a specification.

This invention relates to motor vehicles, and more especially to attachments for such vehicles whereby they may be anchored securely to the ground and utilized in the operation of plows, cultivators or other agricultural implements or machines, my special object being to produce means whereby the earth may be plowed or cultivated expeditiously and economically.

More specifically my object is to produce a motor vehicle provided with a suitable hoist for connection, through the medium of a cable, with an agricultural implement or machine and with an anchoring mechanism engaged by said cable between its point of attachment with the hoist and agricultural machine or implement in such a manner that the resistance offered to the winding of the cable on the drum of the hoist shall cause the anchor to reliably secure the motor vehicle to the ground.

With these objects in view and others as hereinafter appear, the invention consists in certain novel and peculiar features of construction and organization as hereinafter described and claimed; and in order that it may be fully understood reference is to be had to the accompanying drawing, in which—

Figure 1, is a side view of a motor vehicle embodying my invention. Fig. 2, is a top plan view of the same partly broken away to disclose a part otherwise hidden. Fig. 3, is a rear view of the machine. Fig. 4, is a detail elevation of the front or main sprag.

In the said drawing, 1 indicates a motor truck of a common and well known type to which no claim *per se* is made, the engine and certain mechanism of the truck being omitted. The engine of the truck is geared in the customary or any preferred manner, not shown, to the usual counter-shaft 2, suitably journaled and arranged transversely below the truck forward of the rear wheels 3, and said shaft is geared to said rear wheels to impart movement thereto, the mechanism shown for this purpose being a sprocket wheel 4, mounted on said shaft and connected by chain 5 to sprocket wheels 6, bearing a rigid relation to the rear wheels. As thus far described the machine is of common and well known construction, as hereinbefore stated.

Mounted upon the platform or bed of the vehicle is any suitable type of hoist 7, the same embodying a drum 8, equipped with a gear wheel 9, meshing with a gear pinion 10, mounted on a suitably journaled transverse shaft 11, equipped at its ends with sprocket wheels 12, from which chains 13 run down through the bed of the truck, and engage the sprocket wheels 14, on shaft 2, so that the latter shall be utilized in operating the drum. The hoist shown is of that common and well known type known as the "Samson" friction drum belt hoist and is provided with the usual crank 15 whereby it may be thrown in and out of gear with the gear wheel 9, though as this feature does not form a part of the invention it is not described in detail nor illustrated in the drawing. It will also be understood that any suitable clutch mechanism (not shown) will be employed to throw the wheels 3 in and out of gear with the hoist 7, when desired.

16 is a cable wound upon and adapted to be secured at one end to the drum in the usual manner and said cable extends downward and forward through the body of the truck and around a sheave 17, carried by a sprag 18, the cable extending rearwardly from said sheave for attachment to a plow, cultivator, or other implement or machine for propelling the same, the sprag shown consisting of a swing frame 19, of any suitable type, pivoted at 20 to the bed or frame of the truck and equipped at its lower end with one or more downwardly and rearwardly curved flukes 21, for embedment in the ground to anchor the machine against rearward movement when propelling the implement or other machine connected to the rear end of the cable, it being understood that the resistance offered by such implement or machine is the force which effects the embedment of the flukes of the sprag or anchor, and to guard against any possibility of the sprag or anchor swinging rearwardly to or beyond a vertical position and thus result in a failure to operate the plow or other machine, the sprag or anchor is connected forward of its pivotal point to a point fixed with relation to the sprag. The preferred connection is by means of a pair of chains 22 which converge upwardly and forwardly and at their upper ends are attached to the lower end of a chain 23 connected to a reel 24 mounted on the truck bed, said reel by preference, having a gear wheel 25 meshing with a gear pinion 26, mounted on the inner end of a suitably journaled shaft 27 equipped with a crank handle 28 at one end of the seat 29, of the truck, so that the operator upon said seat may conveniently operate said reel and withdraw the sprag or anchor from the ground when the hoist is not in operation, to permit the motor vehicle to move to and from the place of operation.

To coöperate with the sprag or anchor in holding the motor vehicle firmly when engaged in the propulsion of a plow or other implement or machine, I provide an auxiliary sprag 30, pivoted at 31 to the bed of and extending downwardly and rearwardly from the truck near its rear end the said sprag being equipped with flukes 32, which by preference, are curved slightly in the opposite direction to the flukes 21, this curvature being desirable in order that the flukes shall not pull out of the ground too readily in the case of the breakage of said cable or other part, it being noted that when a change of position is desired, that it is unnecessary to raise the auxiliary sprag as it will readily pull out of the ground and ride thereon and always be in position for automatic reëngagement therewith the instant the vehicle feels the resistance of the implement or other machine attached to the rear end of cable 16, and said auxiliary sprag is preferably connected by a chain 33, to the rear end of the bed of the truck to prevent it from ever assuming a vertical position as, in the passing over a ditch, it might engage an obstruction and raise the rear end of the vehicle from the ground.

Assuming that the vehicle is connected to a plow or other implement or machine and that the hoist is thrown in gear, it will be seen that the operation of the engine will result in driving the hoist and winding the cable upon the drum and drawing the plow or other implement or machine through the ground toward the vehicle. When the plow or other implement or machine has attained a position near the vehicle, the hoist is thrown out of gear and the front or main sprag or anchor is raised to an inoperative position. The car is then run to a new position, the cable being paid out by the drum of the hoist so as not to exert a pull on the implement or machine attached to its rear end. When the vehicle has attained the desired position, the front sprag is dropped and the power of the engine is imposed upon the hoist instead of upon the rear wheels, for again advancing the plow or other implement or machine, it being understood in this connection that the proportion of the gearing will be such that the speed of the propelled implement shall be relatively slow, a desirable speed being in the neighborhood of three miles per hour, the speed for the vehicle when not operating the plow or other implement or machine being relatively high so that but little time will be consumed in effecting a change of position.

I wish it to be understood that I do not desire to be limited to the exact details of construction shown and described, for obvious modifications will occur to a person skilled in the art.

I claim:

1. The combination with a motor vehicle of a hoist carried by the vehicle, means pivotally carried by the vehicle for anchoring the latter to the ground, and a cable attached at one end to the hoist and engaging said means and extending therefrom and adapted as wound up by the hoist to exert force upon said means to compel the latter to anchor the vehicle to the ground.

2. The combination with a motor vehicle, of a sprag carried by the vehicle and adapted for engagement with the ground to prevent rearward movement of the vehicle, a sheave carried by said sprag, a hoist carried by the vehicle rearward of the sprag, and a cable extending around said sheave with one end running rearwardly and the other rearwardly and upwardly, the last-named end being attached to the hoist.

3. The combination with a motor vehicle, of a sprag capable of extending downwardly and forwardly from and pivotally attached at its upper end to the motor vehicle, and provided at its lower end with flukes for engagement with the ground to prevent rearward movement of the vehicle, means to prevent the sprag swinging rearward to a vertical position, a sheave carried by said sprag, a hoist carried by the vehicle rearward of the sprag, and a cable extending around said sheave with one end running rearwardly and the other rearwardly and upwardly, the last-named end being attached to the hoist.

4. The combination with a motor vehicle, of a sprag capable of extending downwardly and forwardly from and pivotally attached at its upper end to the motor vehicle, and provided at its lower end with flukes for engagement with the ground to prevent rearward movement of the vehicle, a reel carried by the vehicle forward of the sprag, a flexible connection secured at its upper end to the reel and at its lower end to the sprag, a sheave carried by the sprag, a hoist carried by the vehicle rearward of the sprag, and a cable extending around said sheave with one end running rearwardly and the other rearwardly and upwardly, the last-named end being attached to the hoist.

5. The combination with a motor vehicle, of a sprag pivoted thereto and adapted for engagement with the ground to prevent rearward movement of the vehicle, a sheave carried by said sprag, a hoist carried by the vehicle rearward of the sprag, a cable extending around said sheave with one end running rearwardly and the other rearwardly and upwardly, the last-named end being attached to the hoist, and an auxiliary sprag attached at its upper end to the rear part of the vehicle and extending downwardly and rearwardly therefrom and provided at its lower end with flukes for embedment in the ground.

6. The combination with a motor vehicle, of a sprag pivoted thereto and adapted for engagement with the ground to prevent rearward movement of the vehicle, a sheave carried by said sprag, a hoist carried by the vehicle rearward of the sprag, a cable extending around said sheave with one end running rearwardly and the other rearwardly and upwardly, the last-named end being attached to the hoist, an auxiliary sprag attached at its upper end to the rear part of the vehicle and extending downwardly and rearwardly therefrom and provided at its lower end with flukes for embedment in the ground, and means for preventing the auxiliary sprag from swinging forward to a vertical position.

In testimony whereof I affix my signature, in the presence of two witnesses.

WINFIELD DENTON.

Witnesses:
JOHN H. TOOLE,
G. Y. THORPE.